US012198846B2

(12) United States Patent
Yen et al.

(10) Patent No.: US 12,198,846 B2
(45) Date of Patent: Jan. 14, 2025

(54) EIGHT-SHAPED INDUCTOR FOR USE IN INTEGRATED CIRCUIT STRUCTURE HAVING PLURALITY OF WIRES AND EACH WIRE HAS AT LEAST TWO SUB-WIRES

(71) Applicant: Realtek Semiconductor Corporation, Hsinchu (TW)

(72) Inventors: Hsiao-Tsung Yen, Hsinchu (TW); Ka-Un Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 1283 days.

(21) Appl. No.: 16/823,502

(22) Filed: Mar. 19, 2020

(65) Prior Publication Data

US 2020/0312530 A1 Oct. 1, 2020

Related U.S. Application Data

(60) Provisional application No. 62/826,286, filed on Mar. 29, 2019, provisional application No. 62/871,263, filed on Jul. 8, 2019.

(30) Foreign Application Priority Data

Dec. 10, 2019 (TW) ................................ 108145176

(51) Int. Cl.
*H01F 27/28* (2006.01)

(52) U.S. Cl.
CPC ................................ *H01F 27/2828* (2013.01)

(58) Field of Classification Search
CPC ................ H01F 27/2828; H01F 19/04; H01F 2017/0073; H01F 17/0013; H01F 27/2804;

(Continued)

(56) References Cited

U.S. PATENT DOCUMENTS 5,420,558 A 5/1995 Ito et al.
9,312,060 B2 4/2016 Godoy et al.

(Continued)

FOREIGN PATENT DOCUMENTS

CN 104769687 A 7/2015
CN 108022913 A 5/2018

(Continued)

OTHER PUBLICATIONS

China Patent Office, Office Action of the corresponding Chinese application No. 202010171503.0 dated Mar. 30, 2021.

(Continued)

*Primary Examiner* — Ermias T Woldegeorgis
(74) *Attorney, Agent, or Firm* — Locke Lord LLP; Tim Tingkang Xia, Esq.

(57) ABSTRACT

An inductor device includes a first wire, a second wire, a third wire, a fourth wire and an 8-shaped inductor structure. The first wire is disposed in a first area. The second wire is disposed in a second area. The third wire is disposed in the first area and at least partially overlapped with the first wire in a vertical direction. The third wire includes at least two third sub-wires, and the at least two third sub-wires are arranged with an interval between each other. The fourth wire is at least partially overlapped with the second wire in the vertical direction. The fourth wire includes at least two fourth sub-wires, and the at least two fourth sub-wires are arranged with an interval between each other. The eight-shaped inductor structure is disposed on an outer side of the third wire and the fourth wire.

20 Claims, 6 Drawing Sheets

(58) Field of Classification Search
CPC .. H01F 17/00; H01F 2027/2809; H01F 17/02; H01F 19/00; H01F 27/2823; H01F 27/29; H01F 41/06; H01F 2017/0046
See application file for complete search history.

(56) References Cited

U.S. PATENT DOCUMENTS

| | | | | |
|---|---|---|---|---|
| 10,186,364 | B2 | 1/2019 | Yen et al. | |
| 10,374,571 | B2 | 8/2019 | Wang et al. | |
| 2014/0077919 | A1* | 3/2014 | Godoy | H01F 27/006 336/226 |
| 2017/0012601 | A1* | 1/2017 | Yen | H03H 7/42 |
| 2017/0098500 | A1 | 4/2017 | Yen et al. | |
| 2018/0330872 | A1 | 11/2018 | Yen et al. | |
| 2019/0148479 | A1 | 5/2019 | Yen et al. | |
| 2019/0221350 | A1 | 7/2019 | Yen et al. | |
| 2019/0279809 | A1 | 9/2019 | Yen | |
| 2019/0392980 | A1 | 12/2019 | Yen | |
| 2020/0234864 | A1 | 7/2020 | Elzinga | |

FOREIGN PATENT DOCUMENTS

| | | | |
|---|---|---|---|
| CN | 108962563 | A | 12/2018 |
| JP | 2010154517 | A | 7/2010 |
| TW | 201428783 | A | 7/2014 |
| TW | 201703070 | A | 1/2017 |
| TW | I591800 | B | 7/2017 |
| TW | I643216 | B | 12/2018 |
| TW | I643217 | B | 12/2018 |

OTHER PUBLICATIONS

China Patent Office, Office Action of the corresponding Chinese application No. 201911129792.1 on Mar. 29, 2021.
China Patent Office, Office Action of the related Chinese application No. 202010099915.8 on Mar. 31, 2021.
China Patent Office, Office Action of the related Chinese application No. 202010099595.6 on Mar. 29, 2021.
China Patent Office, Office Action of the related Chinese application No. 202010099604.1 on Mar. 29, 2021.
Taiwan Patent Application 108141274 filed Nov. 13, 2019.

* cited by examiner

EIGHT-SHAPED INDUCTOR FOR USE IN INTEGRATED CIRCUIT STRUCTURE HAVING PLURALITY OF WIRES AND EACH WIRE HAS AT LEAST TWO SUB-WIRES

CROSS-REFERENCE TO RELATED APPLICATION

This application claims priority to U.S. Provisional Patent Application No. 62/826,286, filed on Mar. 29, 2019, U.S. Provisional Patent Application No. 62/871,263, filed on Jul. 8, 2019, and Taiwan Application Serial Number 108145176, filed on Dec. 10, 2019, which are herein incorporated by reference.

BACKGROUND

Field of Invention

The present disclosure relates to an electronic device. More particularly, the present disclosure relates to an inductor device.

Description of Related Art

The various types of inductors that are now available have their advantages and disadvantages. For example, a spiral inductor has a high Q value and a large mutual inductance. However, its mutual inductance value and coupling are both occurred between the coils. In the case of an eight-shaped inductor, which has two sets of coils, the coupling between the two sets of coils is relatively low. However, an eight-shaped inductor occupies a large area in a device. In addition, although a traditional stacked eight-shaped inductor has good symmetry, its inductance value per unit area is low. Therefore, the scopes of application for the above inductors are limited.

For the foregoing reasons, there is a need to solve the above-mentioned problems by providing an inductor device.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide an inductor device, which includes a first wire, a second wire, a third wire, a fourth wire, and an eight-shaped inductor structure. The first wire is disposed in a first area. The second wire is disposed in a second area. The third wire is disposed in the first area and at least partially overlapped with the first wire in a vertical direction. The third wire includes at least two third sub-wires, and the at least two third sub-wires are arranged with an interval between each other. The fourth wire is disposed in the second area and at least partially overlapped with the second wire in the vertical direction. The fourth wire includes at least two fourth sub-wires, and the at least two fourth sub-wires are arranged with an interval between each other. The eight-shaped inductor structure is disposed on an outer side of the third wire and the fourth wire.

Therefore, the inductor device according to embodiments of the present disclosure has a good inductance value per unit area. In addition, the inductor device adopting a stacked structure according to embodiments of the present disclosure is such that the inductance value is canceled in the common mode and increased in the differential mode.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms “a” and “an” include the plural reference unless the context clearly indicates otherwise.

Figure 1:
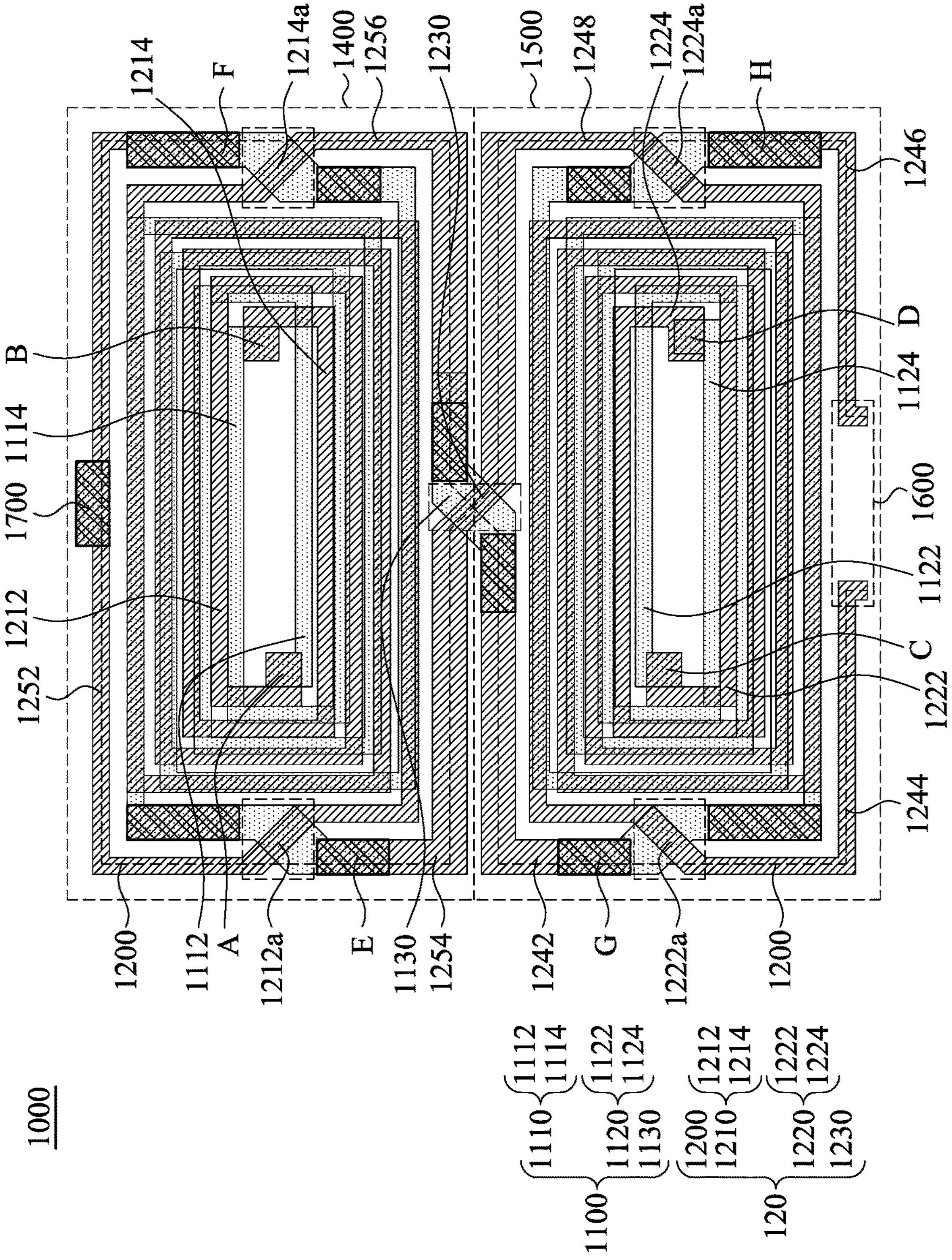
FIG. 1 depicts a schematic diagram of an inductor device according to one embodiment of the present disclosure.

FIG. 1 depicts a schematic diagram of an inductor device 1000 according to one embodiment of the present disclosure. The inductor device 1000 comprises a first wire 1110, a second wire 1120, a third wire 1210, a fourth wire 1220, and an eight-shaped inductor structure 1200. The eight-shaped inductor structure 1200 is an outermost inductor wire (a wire portion shown by a dotted line) of the inductor device 1000. That is to say, the eight-shaped inductor structure 1200 is disposed on outer of the third wire 1210 and the fourth wire 1220. The first wire 1110 and the second wire 1120 are partially overlapped with the third wire 1210 and the fourth wire 1220, and the first wire 1110 and the second wire 1120 are disposed inside the eight-shaped inductor structure 1200.

Figure 2:
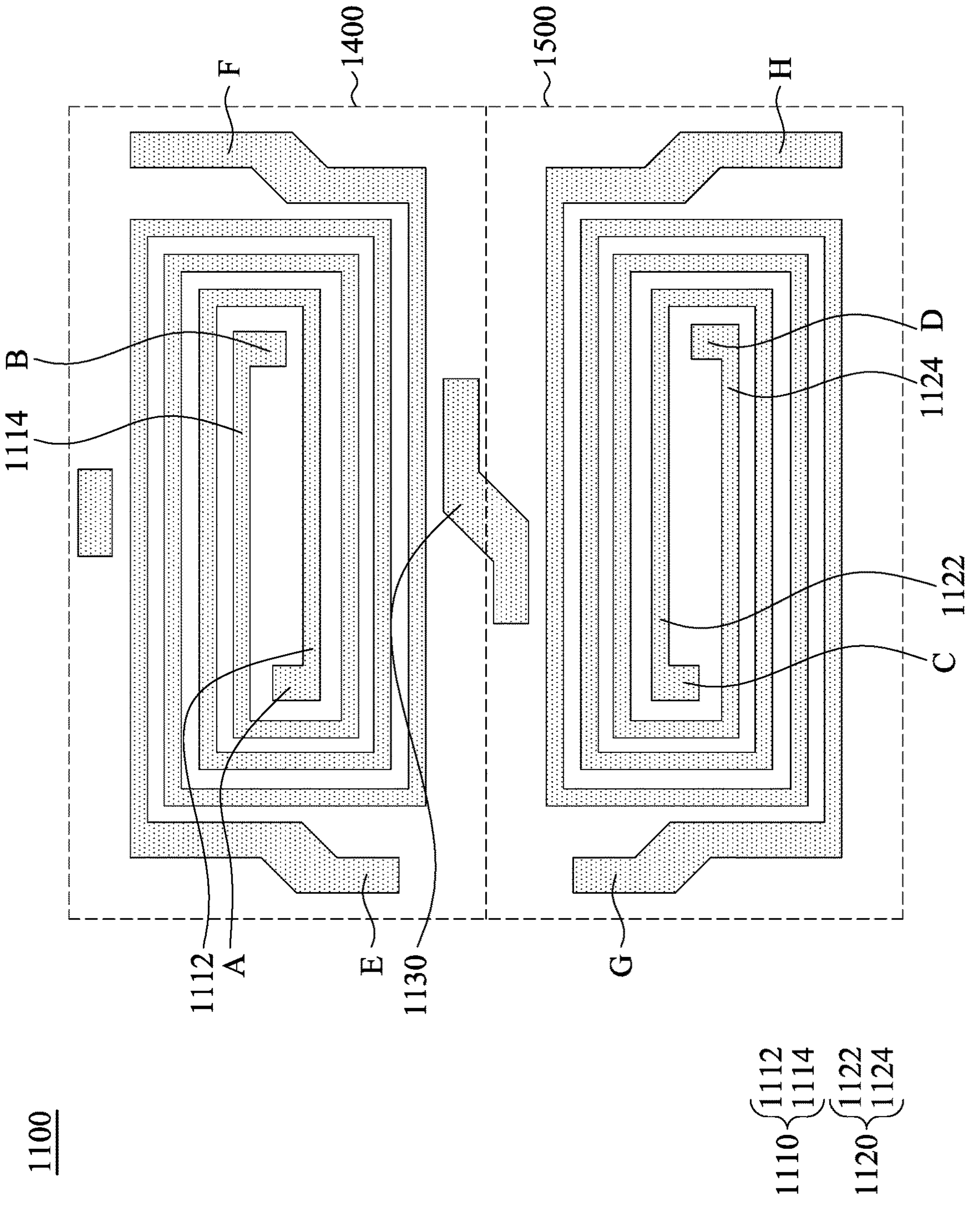
FIG. 2 depicts a schematic diagram of a partial structure of the inductor device shown in FIG. 1 according to one embodiment of the present disclosure.
Figure 3:
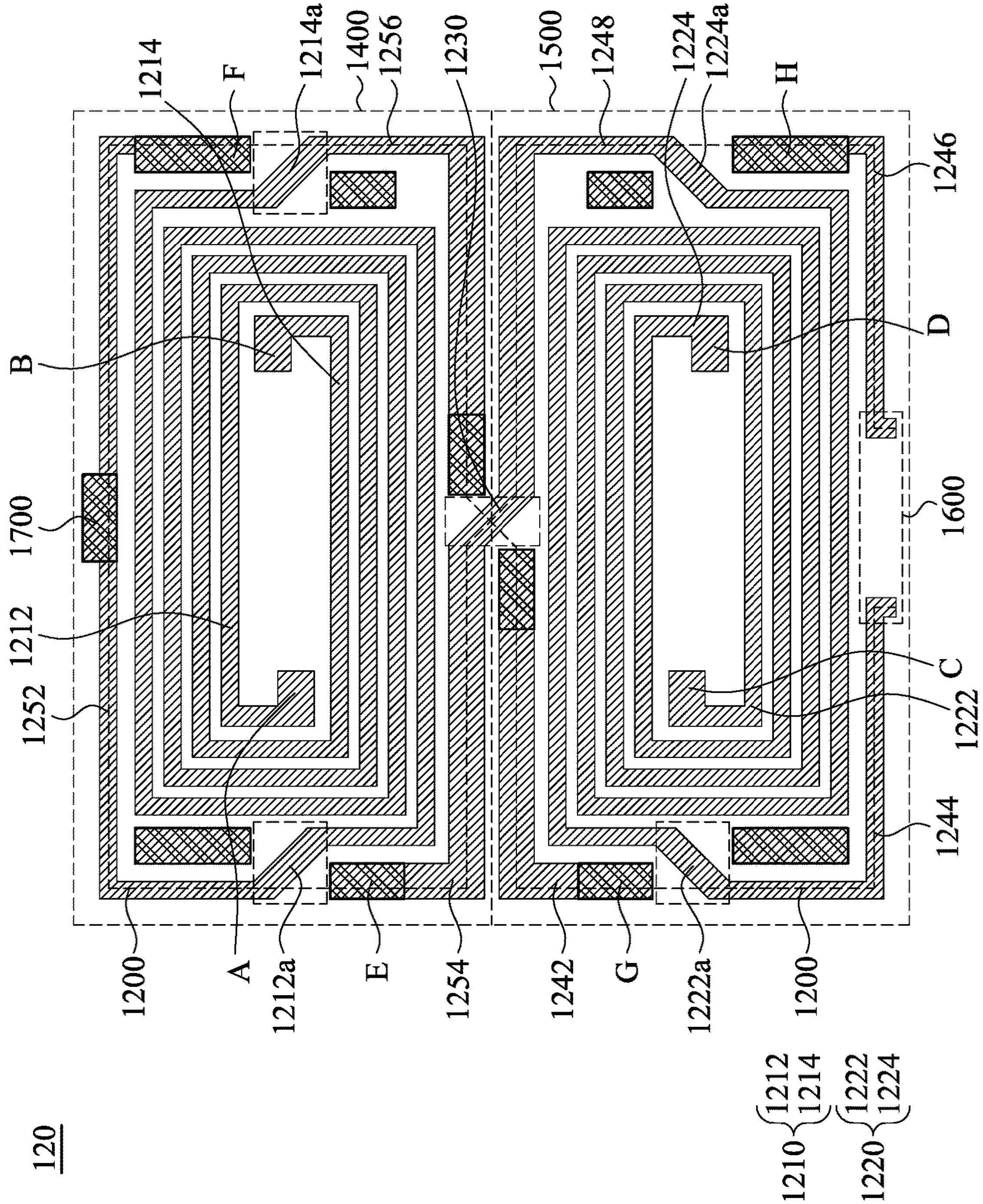
FIG. 3 depicts a schematic diagram of a partial structure of the inductor device shown in FIG. 1 according to one embodiment of the present disclosure.

To facilitate understanding of the present disclosure, the inductor device 1000 shown in FIG. 1 is divided into a partial structure 1100 of the inductor device 1000 shown in FIG. 2 and a partial structure 120 of the inductor device 1000 shown in FIG. 3. The partial structure 120 comprises the eight-shaped inductor structure 1200, the third wire 1210, and the fourth wire 1220. In some embodiments, the eight-shaped inductor structure 1200 comprises a plurality of inductor segments. For example, the eight-shaped inductor structure 1200 comprises inductor segments 1242, 1244, 1246, 1248, 1252, 1254, and 1256, and a crossing portion 1230.

A description is provided with reference to FIG. 1 to FIG. 3. The first wire 1110 comprises at least two first sub-wires 1112 and 1114. The second wire 1120 comprises at least two second sub-wires 1122 and 1124. The third wire 1210 comprises at least two third sub-wires 1212 and 1214. The fourth wire 1220 comprises at least two fourth sub-wires 1222 and 1224. The first wire 1110 is disposed in a first area 1400. The second wire 1120 is disposed in a second area 1500. The first area 1400 is located on an upper side of the inductor device 1000, and the second area 1500 is located on a lower side of the inductor device 1000.

Continued reference is made to FIG. 1 to FIG. 3. The third wire 1210 is disposed in the first area 1400 and at least partially overlapped with the first wire 1110 in a vertical direction. That is to say, the third wire 1210 is disposed above or below the first wire 1110 in the vertical direction. The fourth wire 1220 is disposed in the second area 1500 and at least partially overlapped with the second wire 1120 in the vertical direction. That is to say, the fourth wire 1220 is disposed above or below the second wire 1120 in the vertical direction.

In one embodiment, the at least two first sub-wires 1112 and 1114 are arranged with an interval between each other. For example, the interval between the first sub-wires 1112 and 1114 is 2 um. As shown in FIG. 2, a wire sequence of the first wire 1110 from the innermost wire to the outermost wire (such as the wire sequence from a center of the first wire 1110 in a downward direction) is the first sub-wire 1112, 1114, 1112, 1114, and so on. However, the present disclosure is not limited to such a wire sequence.

In one embodiment, the at least two first sub-wires 1112 and 1114 are disposed in a first circling direction. For example, the first sub-wires 1112 and 1114 are disposed in the counterclockwise direction. In addition, one wire of the first sub-wire 1112 is arranged with an interval to one wire of the second sub-wire 1114, and vice versa. Therefore, the first wire 1110 forms a larger inductor wire.

In one embodiment, the at least two second sub-wires 1122 and 1124 are arranged with an interval between each other. As shown in FIG. 2, a wire sequence of the second wire 1120 from the innermost wire to the outermost wire (such as the wire sequence from a center of the second wire 1120 in a downward direction) is the second sub-wire 1124, 1122, 1124, 1122, and so on. However, the present disclosure is not limited to such a wire sequence.

In one embodiment, the at least two second sub-wires 1122 and 1124 are disposed in a second circling direction. The second circling direction is different from the first circling direction. For example, the second sub-wires 1122 and 1124 are disposed in the clockwise direction. In addition, one wire of the second sub-wire 1122 is arranged with an interval to one wire of the second sub-wire 1124, and vice versa. Therefore, the second wire 1120 forms a larger inductor wire.

In one embodiment, the at least two third sub-wires 1212 and 1214 are arranged with an interval between each other. As shown in FIG. 3, a wire sequence of the third wire 1210 from the innermost wire to the outermost wire (such as the wire sequence from a center of the third wire 1210 in a downward direction) is the third sub-wire 1214, 1212, 1214, 1212, and so on. However, the present disclosure is not limited to such a wire sequence.

In one embodiment, the at least two third sub-wires 1212 and 1214 are disposed in the first circling direction. For example, the third sub-wires 1212 and 1214 are disposed in the clockwise direction. In addition, one wire of the third sub-wire 1212 is arranged with an interval to one wire of the third sub-wire 1214, and vice versa. Therefore, the third wire 1210 forms a larger inductor wire.

In one embodiment, the at least two fourth sub-wires 1222 and 1224 are arranged with an interval between each other. As shown in FIG. 3, a wire sequence of the fourth wire 1210 from the innermost wire to the outermost wire (such as the wire sequence from a center of the fourth wire 1220 in a downward direction) is the fourth sub-wire 1222, 1224, 1222, 1224, and so on. However, the present disclosure is not limited to such a wire sequence.

In one embodiment, the at least two fourth sub-wires 1222 and 1224 are disposed in the second circling direction. The second circling direction is different from the first circling direction. For example, the fourth sub-wires 1222 and 1224 are disposed in the clockwise direction. In addition, one wire of the fourth sub-wire 1222 is arranged with an interval to one wire of the fourth sub-wire 1224, and vice versa. Therefore, the fourth wire 1220 forms a larger inductor wire. Note that, the above mentioned interval distance between the first sub-wires, second sub-wires, third sub-wires and forth sub-wires may not be necessarily constant and can be adjusted in practical need.

In one embodiment, one of the at least two first sub-wires 1112 and 1114 is coupled to one of the at least two third wires 1212 and 1214. For example, the first sub-wire 1112 is coupled to the third sub-wire 1212 at a connection point A, and the first sub-wire 1114 is coupled to the third sub-wire 1214 at a connection point B. Additionally, the first sub-wire 1112 and the third sub-wire 1212 may be coupled through a vertical connector (i.e., a via) at the connection point A in a top-view direction of the inductor device 1000. In addition, the first sub-wire 1114 and the third sub-wire 1214 may be coupled through a vertical connector at the connection point B in a top-view direction of the inductor device 1000 (i.e., in a direction looking down from a point above the inductor device 1000). However, the present disclosure is not limited to such connections, and a person with ordinary skill in the art can design connections depending on practical needs. In one embodiment, the third wire 1210 is substantially overlapped with the first wire 1110 in a direction which is vertical to the third wire 1210.

In one embodiment, one of the at least two second sub-wires 1122 and 1124 is coupled to one of the at least two fourth sub-wires 1222 and 1224. For example, the second sub-wire 1122 is coupled to the fourth sub-wire 1222 at a connection point C, and the second sub-wire 1124 is coupled to the fourth sub-wire 1224 at a connection point D. The second sub-wire 1122 and the fourth sub-wire 1222 may be coupled to a vertical connector at the connection point C in a top-view direction of the inductor device 1000. The second sub-wire 1124 may be coupled to the fourth sub-wire 1224 through a vertical connector at the connection point D. However, the present disclosure is not limited to such connections. In one embodiment, the fourth wire 1220 is substantially overlapped with the second wire 1120 in a direction which is vertical to the fourth wire 1220.

In one embodiment, each of the at least two first sub-wires 1112, 1114, the at least two second sub-wires 1122, 1124, the at least two third sub-wires 1212, 1214, and the at least two fourth sub-wires 1222, 1224 has multiple windings. However, the present disclosure is not limited to the number of windings shown in the drawings, and a person with ordinary skill in the art can design the number of windings depending on practical needs.

In one embodiment, the at least two first sub-wires 1112 and 1114 are not coupled directly to each other, and the at least two second sub-wires 1122 and 1124 are not coupled directly to each other. That is to say, the at least two first sub-wires 1112 and 1114 are not coupled to each other without additional connector and/or wire. In one embodiment, the at least two third sub-wires 1212 and 1214 are not coupled directly to each other, and the at least two fourth sub-wires 1222 and 1224 are not coupled directly to each other.

With continued reference to FIG. 1 to FIG. 3, the eight-shaped inductor structure 1200 is coupled with one of the at least two third sub-wires 1212, 1214 on a first side of the first area 1400 in an interlaced manner, and the eight-shaped inductor structure 1200 is coupled with another of the at least two third sub-wires 1212, 1214 on a second side of the first area 1400 in an interlaced manner. In one embodiment, the first side of the first area 1400 is opposite to the second side of the first area 1400. For example, the eight-shaped inductor structure 1200 is coupled with the third sub-wire 1212 on the left side of the first area 1400 (such as at a crossing portion 1212*a*) in an interlaced manner, and the eight-shaped inductor structure 1200 is coupled with the third sub-wire 1214 on the right side of the first area 1400 (such as at a crossing portion 1214*a*) in an interlaced manner.

In one embodiment, the third wire 1210 is partially overlapped with the first wire 1110 in the direction which is vertical to the third wire 1210. In other words, the third wire 1210 is partially overlapped with the first wire 1110 in a top-view direction of the inductor device 1000.

Continued reference is made to FIG. 1 to FIG. 3. The eight-shaped inductor structure 1200 is coupled with one of the at least two fourth sub-wires 1222, 1224 on a first side of the second area 1500 in an interlaced manner, and the eight-shaped inductor structure 1200 is coupled with another of the at least two fourth sub-wires 1222, 1224 on a second side of the second area 1500 in an interlaced manner. In one embodiment, the first side of the second area 1500 is opposite to the second side of the second area 1500. For example, the eight-shaped inductor structure 1200 is coupled with the fourth sub-wire 1222 on the left side of the second area 1500 (such as at a crossing portion 1222*a*) in an interlaced manner, and the eight-shaped inductor structure 1200 is coupled with the fourth sub-wire 1224 on the right side of the second area 1500 (such as at a crossing portion 1224*a*) in an interlaced manner.

In one embodiment, the fourth wire 1220 is partially overlapped with the second wire 1120 in the direction which is vertical to the fourth wire 1220. In other words, the fourth wire 1220 is partially overlapped with the second wire 1120 in a top-view direction of the inductor device 1000.

In one embodiment, the inductor device 1000 further comprises a connector 1130 (as shown in FIG. 2). The connector 1130 is disposed above the eight-shaped inductor structure 1200 or below the eight-shaped inductor structure 1200 in the vertical direction. The connector 1130 and the crossing portion 1230 are disposed at a junction of the first area 1400 and the second area 1500 such that the connector 1130 and the crossing portion 1230 are coupled at an intersection between the upper half of the eight-shaped inductor structure 1200 and the lower half of the eight-shaped inductor structure 1200, in order that the eight-shaped inductor structure 1200 forms the eight-shaped circuit.

In one embodiment, the first wire 1110 and the second wire 1120 are located on a same layer, and the third wire 1210 and the fourth wire 1220 are located on a same layer. The first wire 1110 is located on a different layer from the third wire 1210, and the second wire 1120 is located on a different layer from the fourth wire 1220.

With continued reference to FIG. 1 to FIG. 3, the inductor device 1000 further comprises an input terminal 1600. The input terminal 1600 is disposed on one side of the second area 1500 (such as the lower side in the drawings). The inductor device 1000 further comprises a center-tapped terminal 1700. The center-tapped terminal 1700 is disposed on one side of the first area 1400 (such as the upper side in the drawings).

In one embodiment, when a signal is input in to one port of the input terminal 1600 (such as the left port), the signal is transmitted through the inductor segment 1244 and the crossing portion 1222*a* to the fourth sub-wire 1222 and is transmitted in the fourth sub-wire 1222 in the first circling direction (such as the clockwise direction). The signal is transmitted from the fourth sub-wire 1222 through the connection point C to the second sub-wire 1122, and the signal is transmitted in the second sub-wire 1122 in the first direction (such as the clockwise direction). The signal is transmitted from the second sub-wire 1122 through the connection point G to the inductor segment 1242, and the signal is transmitted through the connector 1130 to the inductor segment 1256.

The signal is transmitted through the inductor segment 1256 and the crossing portion 1214*a* to the third sub-wire 1214 and transmitted in the third sub-wire 1214 in the second circling direction (such as the counterclockwise direction). The signal is transmitted from the third sub-wire 1214 through the connection point B to the first sub-wire 1114 and transmitted in the first sub-wire 1114 in the second circling direction (such as the counterclockwise direction). The signal is transmitted to the inductor segment 1252 through the connection point F and transmitted through the crossing portion 1212*a* to the third sub-wire 1212. The signal is transmitted in the third sub-wire 1212 in the second circling direction. The signal is transmitted through the connection point A to the first sub-wire 1112 and transmitted in the first sub-wire 1112 in the second circling direction. The signal is transmitted through the connection point E to the inductor segment 1254 and transmitted through the crossing portion 1230 to the inductor segment 1248.

The signal is transmitted through the inductor segment 1248 and the crossing portion 1224*a* to the fourth sub-wire 1224 and transmitted in the fourth sub-wire 1224 in the first circling direction. The signal is transmitted through the connection point D to the second sub-wire 1124. The signal is transmitted through the connection point H to the inductor segment 1246 and outputted at another port of the input terminal 1600 (such as the right port).

Figure 4:
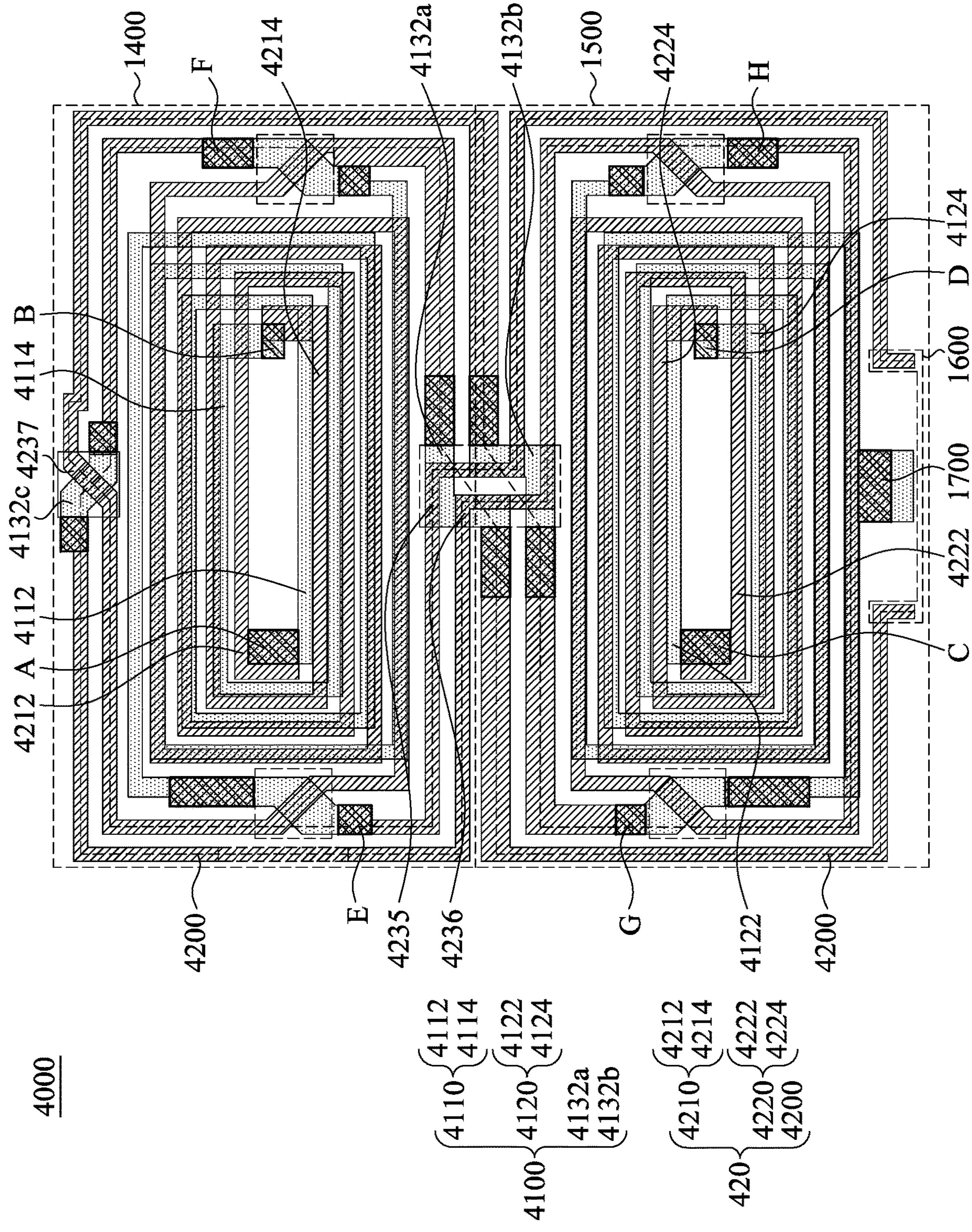
FIG. 4 depicts a schematic diagram of an inductor device according to one embodiment of the present disclosure.

FIG. 4 depicts a schematic diagram of an inductor device 4000 according to one embodiment of the present disclosure. The inductor device 4000 comprises an inductor device partial structure 4100 and a partial structure 420. The inductor device partial structure 4100 comprises a first wire 4110 and a second wire 4120. The partial structure 420 comprises an eight-shaped inductor structure 4200, a third wire 4210, and a fourth wire 4220.

In one embodiment, the first wire 4110 comprises at least two first sub-wires 4112, 4114. The second wire 4120 comprises at least two second sub-wires 4122, 4124. The third wire 4210 comprises at least two third sub-wires 4212, 4214. The fourth wire 4220 comprises at least two fourth sub-wires 4222, 4224. The technical terms and structural features in FIG. 4 are similar to those in FIG. 1 to FIG. 3, and so reference may be made to FIG. 1 to FIG. 3 and the description given above.

In one embodiment, the eight-shaped inductor structure 4200 is a wire structure of two wires which is disposed on outer side of the third wire 4210 and the fourth wire 4220.

In one embodiment, the inductor device 4000 further comprises a connector 4132*a*, 4132*b*. The eight-shaped inductor structure 4200 is coupled through the connector 4132*a* and the connector 4132*b* at a junction of the first area 1400 and the second area 1500 in an interlaced manner. The connector 4132*a* and the connector 4132*b* are disposed above or below a crossing portion 4235 of the eight-shaped inductor structure 4200 and a crossing portion 4236 of the eight-shaped inductor structure 4200 in the vertical direction. The eight-shaped inductor structure 4200 is coupled with the connector 4132*c* through a crossing portion 4237 on one side of the first area 1400 (such as the upper side in the drawings) in an interlaced manner. The connector 4132*c* is disposed above or below the crossing portion 4237 of the eight-shaped inductor structure 4200 in the vertical direction. Similar to the configuration in FIG. 1 to FIG. 3, the eight-shaped inductor structure 4200 is coupled with the third wire 4210 through the crossing portions of the third wire 4210 in an interlaced manner, and the eight-shaped inductor structure 4200 is coupled with the fourth wire 4220 through the crossing portions of the fourth wire 4220 in an interlaced manner. A description in this regard is not repeated herein in view of the similarity to the configuration in FIG. 1 to FIG. 3, as mentioned above.

In one embodiment, the inductor device 4000 comprises an input terminal 1600 and a center-tapped terminal 1700. The input terminal 1600 and the center-tapped terminal 1700 are disposed on one side (such as the lower side in the drawings) of the second area 1500 opposite to the junction. In other words, the input terminal 1600 and the center-tapped terminal 1700 are disposed on the same side of the inductor device 4000.

Figure 5:
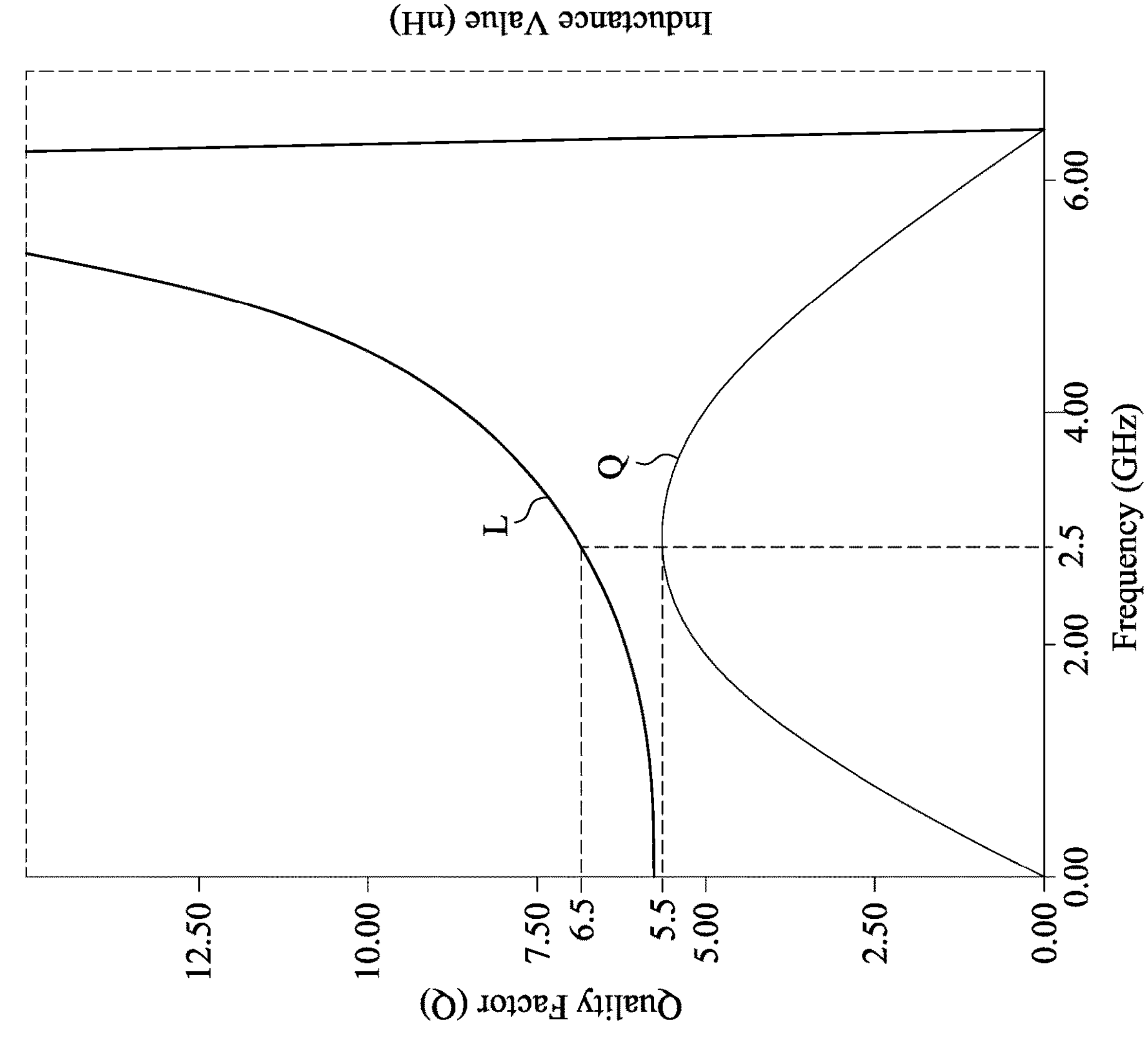
FIG. 5 depicts a schematic diagram of experimental data of an inductor device according to one embodiment of the present disclosure.

FIG. 5 depicts a schematic diagram of experimental data of the inductor device 1000 according to one embodiment of the present disclosure. As shown in the figure, with the structural configuration according to the present disclosure in the differential mode, the experimental curve of the quality factor is Q and the experimental curve of the inductance value is L. As shown in FIG. 5, the inductor device 1000 adopting the structure of the present disclosure has a good inductance value per unit area. For example, the inductor device 1000 has an inductance value that can reach about 6.5 nH and a quality factor (Q) of about 5.5 at a frequency of 2.5 GHz within an area of 90 um*90 um.

Figure 6:
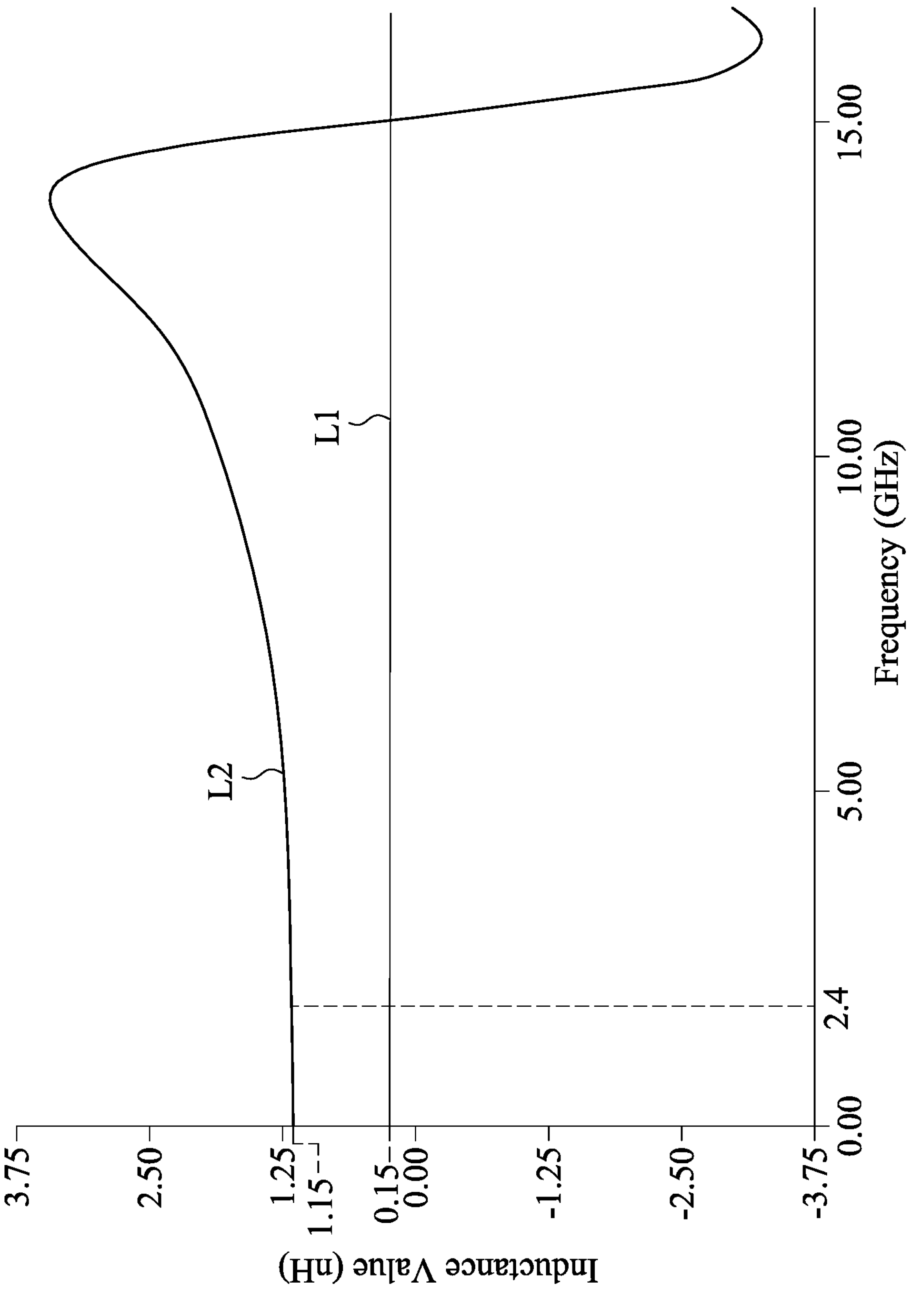
FIG. 6 depicts a schematic diagram of experimental data of an inductor device according to one embodiment of the present disclosure.

FIG. 6 depicts a schematic diagram of experimental data of the inductor device 1000 according to one embodiment of the present disclosure in the common mode. As shown in the figure, the experimental curve of the inductance value of the inductor device adopting the structural configuration of the present disclosure is L1, and the experimental curve of the inductance value of the inductor device not adopting the structural configuration of the present disclosure is L2. As shown in FIG. 6, the inductor device 1000 adopting the structure of the present disclosure has a low inductance value in the common mode. For example, at a frequency of about 2.4 GHz, the inductance value of the inductor device not adopting the structural configuration of the present disclosure is about 1.15 nH, but the inductance value of the inductor device 1000 according to the present disclosure is only about 0.15 nH. In addition, with the inductor device adopting the stacked structure, although the input terminal 1600 inputs the same alternating current, the current direction of the inductor device is reversed in the common mode. Therefore, the inductance value is canceled in the common mode, such that the circuit characteristics (e.g., the second harmonic) in the differential mode can be improved.

It can be understood from the embodiments of the present disclosure that application of the present disclosure has a number of advantages. The inductor device adopting the structure according to the embodiment of the present disclosure has a good inductance value per unit area. In addition, the inductor device adopting the stacked structure according to the embodiment of the present disclosure can cause the inductance value to be decreased in the common mode and the inductance value to be increased in the differential mode.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:

a first wire disposed in a first area, wherein the first wire comprises at least two first sub-wires;

a second wire disposed in a second area, wherein the second wire comprises at least two second sub-wires, wherein the at least two first sub-wires are not coupled directly with each other;

a third wire disposed in the first area, the third wire being at least partially overlapped with the first wire in a vertical direction, wherein the third wire comprises at least two third sub-wires, and the at least two third sub-wires are arranged with an interval between each other;

a fourth wire disposed in the second area, the fourth wire being at least partially overlapped with the second wire in the vertical direction, wherein the fourth wire comprises at least two fourth sub-wires, and the at least two fourth sub-wires are arranged with an interval between each other; and an eight-shaped inductor structure disposed on an outer side of the third wire and the fourth wire.

2. The inductor device of claim 1, wherein the at least two first sub-wires are arranged in a first circling direction with each other.

3. The inductor device of claim 2, wherein the at least two second sub-wires are arranged in a second circling direction with each other, wherein the second circling direction is different from the first circling direction.

4. The inductor device of claim 1, wherein the at least two third sub-wires are arranged in a first circling direction with each other.

5. The inductor device of claim 4, wherein the at least two fourth sub-wires are arranged in a second circling direction with each other, wherein the first circling direction is different from the second circling direction.

6. The inductor device of claim 1, wherein the eight-shaped inductor structure is coupled with a crossing portion on a fourth side of the first area in an interlaced manner.

7. The inductor device of claim 6, further comprising:

an input terminal disposed on a fourth side of the second area; and a center-tapped terminal disposed on the fourth side of the second area, wherein the fourth side of the first area is opposite to the fourth side of the second area.

8. The inductor device of claim 1, wherein the at least two third sub-wires are not coupled directly with each other.

9. The inductor device of claim 1, wherein the at least two fourth sub-wires are not coupled directly with each other.

10. The inductor device of claim 1, wherein one of the at least two first sub-wires is coupled with one of the at least two third sub-wires.

11. The inductor device of claim 1, wherein one of the at least two second sub-wires is coupled to one of the at least two fourth sub-wires.

12. The inductor device of claim 1, wherein the eight-shaped inductor structure is coupled with one of the at least two third sub-wires on a first side of the first area in an interlaced manner, and the eight-shaped inductor structure is coupled with another of the at least two third sub-wires on a second side of the first area in an interlaced manner, wherein the first side of the first area is opposite to the second side of the first area.

13. The inductor device of claim 1, wherein the eight-shaped inductor structure is coupled with one of the at least two fourth sub-wires on a first side of the second area in an interlaced manner, and the eight-shaped inductor structure is coupled with another of the at least two fourth sub-wires on a second side of the second area in an interlaced manner, wherein the first side of the second area is opposite to the second side of the second area.

14. The inductor device of claim 1, wherein the eight-shaped inductor structure is coupled at a junction of the first area and the second area in an interlaced manner.

15. The inductor device of claim 1, further comprising:

an input terminal disposed on a third side of the second area; and a center-tapped terminal disposed on a third side of the first area, wherein the third side of the first area is opposite to the third side of the second area.

16. The inductor device of claim 1, wherein the eight-shaped inductor structure is a wire structure of two wires which is disposed on an outer side of the third wire and the fourth wire.

17. The inductor device of claim 1, wherein the first wire and the second wire are located on a same layer, and the third wire and the fourth wire are located on a same layer.

18. The inductor device of claim 1, wherein the first wire is located on a different layer from the third wire, and the second wire is located on a different layer from the fourth wire.

19. An inductor device, comprising:

a first wire disposed in a first area, wherein the first wire comprises at least two first sub-wires, wherein the at least two first sub-wires are arranged in a circling direction with each other;

a second wire disposed in a second area, wherein the second wire comprises at least two second sub-wires;

a third wire disposed in the first area, the third wire being at least partially overlapped with the first wire in a vertical direction, wherein the third wire comprises at least two third sub-wires, and the at least two third sub-wires are arranged with an interval between each other;

a fourth wire disposed in the second area, the fourth wire being at least partially overlapped with the second wire in the vertical direction, wherein the fourth wire comprises at least two fourth sub-wires, and the at least two fourth sub-wires are arranged with an interval between each other; and an eight-shaped inductor structure disposed on an outer side of the third wire and the fourth wire.

20. An inductor device, comprising:

a first wire disposed in a first area, wherein the first wire comprises at least two first sub-wires;

a second wire disposed in a second area, wherein the second wire comprises at least two second sub-wires, wherein the at least two second sub-wires are not coupled directly with each other;

a third wire disposed in the first area, the third wire being at least partially overlapped with the first wire in a vertical direction, wherein the third wire comprises at least two third sub-wires, and the at least two third sub-wires are arranged with an interval between each other;

a fourth wire disposed in the second area, the fourth wire being at least partially overlapped with the second wire in the vertical direction, wherein the fourth wire comprises at least two fourth sub-wires, and the at least two fourth sub-wires are arranged with an interval between each other; and an eight-shaped inductor structure disposed on an outer side of the third wire and the fourth wire.

* * * * *